March 28, 1944.  T. E. BROOKS  2,345,029
MAGNETIC PLUG
Filed Nov. 30, 1942
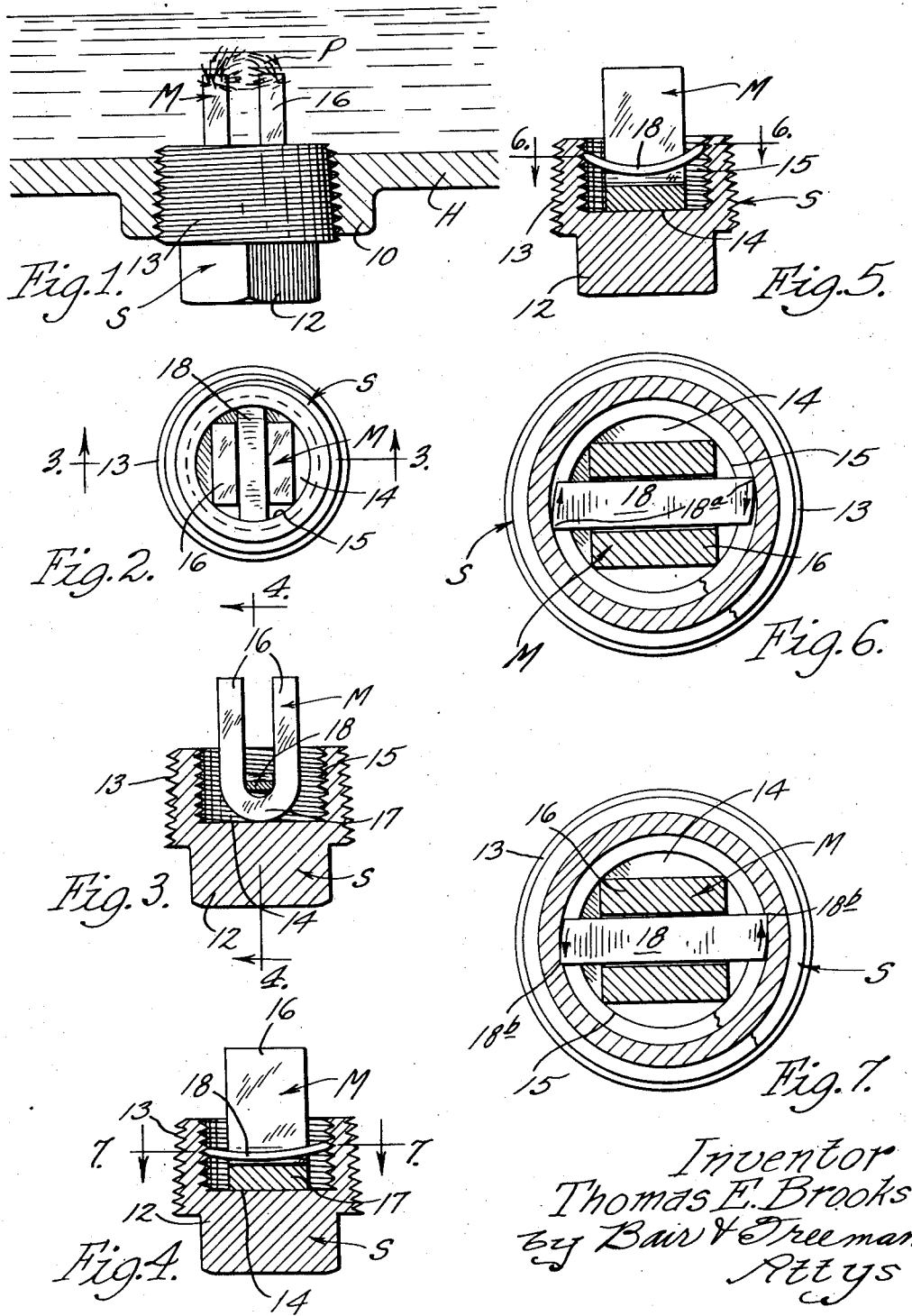
Inventor
Thomas E. Brooks
by Bair & Freeman
Attys Patented Mar. 28, 1944

2,345,029

UNITED STATES PATENT OFFICE 2,345,029

MAGNETIC PLUG

Thomas E. Brooks, Clarinda, Iowa, assignor to Lisle Corporation, Clarinda, Iowa, a corporation of Iowa Application November 30, 1942, Serial No. 467,427

7 Claims. (Cl. 209—215)

My present invention relates to magnetic plugs for gear and other housings wherein plugs are provided with magnets for the purpose of attracting broken gears and other steel or ferrous particles within the housing.

One object of the invention is to provide a plug which is practical from a manufacturing standpoint, and capable of inexpensive production.

A further object is to provide supporting means for a magnet so that the magnet may be located within a gear housing or the like, together with an efficient means for rigidly and permanently connecting the magnet to its supporting means.

Still a further object is to provide a magnetic plug which will operate to attract particles from circulation in oil or grease used to lubricate gears and other mechanism within a housing.

Still a further object is to provide a means for fastening a magnet relative to a supporting means, such as a plug or body, which does not necessitate drilling a hole or forming other openings in the magnet, magnets, of course, being extremely hard and difficult to machine without adversely affecting their magnetic properties.

Another object is to provide means for securing a horseshoe magnet in a shell-like support therefor comprising a retainer bar between the poles of the magnet and having its ends associated with threads formed on the inner wall of a socket of the support whereby rotation of the magnet in one direction will cause the ends of the retainer bar to coact with the threads, and the bar itself to travel toward the bottom of the socket, thereby holding the magnet in the socket.

Still another object is to provide the retainer bar of bowed formation and of spring metal so that at its final position it biases the magnet toward the bottom of the socket, and its effective length is increased so as to tightly wedge the retainer bar in the threads of the socket.

Still another object is to form the ends of the retainer bar so that they prevent reverse rotation and thereby eliminate the possibility of any loosening of the magnet once it is mounted in the support.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a sectional view through a lubricant opening boss of a transmission housing or the like, showing one of my magnetic plugs installed therein;

Figure 2 is a plan view of the magnetic plug shown in Figure 1;

Figure 3 is a vertical sectional view on the line 3—3 of Figure 2;

Figure 4 is a vertical sectional view on the line 4—4 of Figure 3;

Figure 5 is a view similar to Figure 4, showing the parts being assembled;

Figure 6 is a sectional view on the line 6—6 of Figure 5; and

Figure 7 is a sectional view on the line 7—7 of Figure 4.

On the accompanying drawing I have used the reference character H to indicate a gear housing or the like, such as one used for transmission or differential gears. The housing H has a boss 10 ordinarily utilized for receiving a drain plug or a plug which can be removed for introducing lubricant into the housing H, depending, of course, on the installation.

My magnetic plug comprises a shell S, threaded into the boss 10, and a magnet M mounted in the plug. The shell has an integral nut portion 12 for removing and positioning the shell relative to the boss 10, and has a threaded portion 13 for coaction with the threads of the boss. Within the shell S, I provide a recess 14, the vertical wall of which is threaded, as indicated at 15. The magnet M is of horseshoe type, having a pair of poles 16 and a cross-piece 17.

The magnet M is held in the socket 14 by a retainer bar 18 having its ends engaging the threads 15, as shown in Figure 4.

In Figure 5, I show how the magnet and retainer bar are assembled with relation to the shell S. The magnet is first placed in the socket 14 and the retainer bar 18 then placed in position between the poles 16 of the magnet. The ends of the retainer bar are then caused to engage the threads 15. If these threads are righthand, then clockwise rotation of the magnet, as in Figure 6, will carry the retainer bar 18 with it, and the retainer bar will travel down the threads 15, thereby gradually approaching the bottom of the socket 14.

The center of the retainer bar eventually engages the cross-piece 17 of the magnet M, and, thereupon, any further rotation will tend to flatten the bar from the initial curved shape of Figure 5 to the less curved shape of Figure 4. The bar, being of spring metal, thereby biases the magnet toward the bottom of the socket in the shell and effectively retains it in that position.

Due to the flattening of the bar from the position of Figure 5 to the position of Figure 4, its ends move further apart, and thus frictionally engage the threads 15, thus minimizing the possibility of unscrewing of the retainer bar with respect to the threads. A further safeguard against such unscrewing is provided by skewing the ends of the bar 18 to form acute angled corners 18ª, as shown in Figure 6, the direction of skew being such as to permit the bar to readily rotate in a right-hand direction, but gouge into the bottoms of the threads 15 if rotated in a reverse direction, as shown at 18ᵇ in Figure 7. This effectively eliminates any possibility of either accidental or intentional removal of the magnet from the shell after it has once been assembled therein. The result is a very efficient holding means for the magnet with relation to the shell, and one which can be operated for assembling the parts together with a minimum of effort, time and parts, and with the assurance that simply screwing the magnet into position will effect a relation of parts that obviates any subsequent loosening of the magnet.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a magnetic plug, a supporting member having a threaded socket therein, a horseshoe magnet received in said socket, and a retainer bar between the poles of said magnet for movement in the slot thereof formed by said poles and said retainer bar having its ends engaging the threads of said socket whereby rotation of said magnet in one direction causes said retainer bar to travel toward the bottom of said socket, engage the cross-piece of the magnet and cause the cross-piece to engage the bottom of the socket.

2. In a magnetic plug, a supporting member having a threaded socket therein, a horseshoe magnet received in said socket, and a retainer element between the poles of said magnet, screw-threadedly engaging the threads of said socket and contact engaging the cross-piece of the magnet.

3. A magnetic plug comprising a support having a threaded socket therein, a U-shaped magnet received in said socket, and a retainer bar between the poles of said magnet and having its ends engaging the threads of said socket, rotation of said magnet in one direction effecting travel of said retainer bar toward the bottom of said socket into forcible engagement with the cross-piece of said magnet and thereby causing said cross-piece to forcibly engage the bottom of the socket.

4. A magnetic plug comprising a supporting member having a threaded socket therein, a horseshoe magnet received in said socket, a retainer bar between the poles of said magnet, bowed under tension and having its ends engaging the threads of said socket whereby rotation of said magnet in one direction causes said retainer bar to travel toward the bottom of said socket, engage the cross-piece of the magnet and cause the cross-piece to engage the bottom of the socket, said retainer bar being formed of spring metal whereby to resiliently engage said cross-piece and cause it to resiliently engage said socket bottom due to such bowing of the bar, the ends of said retainer bar being skewed to permit rotation in said one direction and prevent reverse rotation thereof also due to such bowing.

5. A magnetic plug comprising a supporting member having a threaded socket therein, a horseshoe magnet received in said socket, a retainer bar between the poles of said magnet and having its ends engaging the threads of said socket whereby rotation of said magnet in one direction rotates said retainer bar and thereby causes it to travel toward the bottom of said socket independent of the magnet, said retainer bar being formed of spring metal and bowed downwardly toward the center thereof whereby to resiliently engage said cross-piece and cause it to resiliently engage said socket bottom.

6. In a magnetic plug, a support having a threaded socket therein, a horseshoe magnet received in said socket, a retainer element between the poles of said magnet and threadedly engaging the threads of said socket whereby rotation of said magnet in one direction causes said retainer element to engage the cross-piece of the magnet with the bottom of the socket, said retainer element being bowed downwardly at its center; whereby to exert thrust engagement against said cross-piece and cause it to engage said socket bottom.

7. In a magnetic plug, a supporting member having a threaded socket therein, a horseshoe magnet received in said socket, a retainer bar between the poles of said magnet and having its ends engaging the threads of said socket whereby rotation of said magnet in one direction causes said retainer bar to travel toward the bottom of said socket independent of the magnet, engage the cross-piece of the magnet and cause said cross-piece to engage the bottom of said socket, said retainer bar being bowed and its ends being skewed to permit rotation thereof in said one direction and prevent reverse rotation thereof.

THOMAS E. BROOKS.